(12) United States Patent
Beck et al.

(10) Patent No.: US 11,568,318 B2
(45) Date of Patent: Jan. 31, 2023

(54) METHOD FOR DEVELOPING MACHINE-LEARNING BASED TOOL

(71) Applicant: PANASONIC INTELLECTUAL PROPERTY MANAGEMENT CO., LTD., Osaka (JP)

(72) Inventors: Ariel Beck, Singapore (SG); Chandra Suwandi Wijaya, Singapore (SG)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 367 days.

(21) Appl. No.: 17/064,692

(22) Filed: Oct. 7, 2020

(65) Prior Publication Data

US 2022/0107788 A1 Apr. 7, 2022

(51) Int. Cl.
*G06F 8/34* (2018.01)
*G06N 20/00* (2019.01)
(Continued)

(52) U.S. Cl.
CPC .............. *G06N 20/00* (2019.01); *G06F 8/34* (2013.01); *G06F 16/245* (2019.01); *G06K 9/6227* (2013.01); *G06K 9/6253* (2013.01); *G06K 9/6256* (2013.01); *G06K 9/6262* (2013.01); *G06K 9/6267* (2013.01); *G06Q 10/06395* (2013.01); *G06Q 10/101* (2013.01);
(Continued)

(58) Field of Classification Search
CPC ...... A61B 34/30; G06V 10/235; G06V 10/40; G06V 10/06395; G06V 10/101; G16H 15/00; G06N 20/00; G09B 19/167; G06T 7/30; G06T 7/0002; G06T 2200/24; G06T 2207/20081; G06T 2207/20104; G06K 9/6227; G06K 9/6253; G06K 9/6256; G06K 9/6262; G06K 9/6267; G06F 8/34; G06F 16/245
See application file for complete search history.

(56) References Cited

U.S. PATENT DOCUMENTS 7,908,183 B2 3/2011 Jacobi et al.
10,949,672 B1* 3/2021 Tang ................... G09B 19/167
(Continued)

FOREIGN PATENT DOCUMENTS

CN 101782976 A 7/2010

*Primary Examiner* — Tuan A Vu
(74) *Attorney, Agent, or Firm* — McDermott Will & Emery LLP

(57) ABSTRACT

A method for developing machine-learning (ML) based tool including initializing an input dataset, which is pre-processed by a first model to harmonize the dataset. Historical data similar to the input data set is fetched from a historical database. Based thereupon a controller recommends a method and a control-setting associated with the identified model for the visual inspection process to a user. Thereafter, the dataset is annotated by a second model to define a labelled data set. A plurality of features are extracted with respect to the data set through a feature extractor. A machine-learning classifier operates upon the extracted features and classifies the dataset with respect to one or more labels. A meta controller communicates with one or more of the first model, the second model, the feature extractor and the selected classifier for assessing a performance of at least one of first model and the feature extractor.

20 Claims, 14 Drawing Sheets

(51) Int. Cl.
*G06Q 10/10* (2012.01)
*G06Q 10/06* (2012.01)
*G06T 7/00* (2017.01)
*G06T 7/30* (2017.01)
*G06K 9/62* (2022.01)
*G06F 16/245* (2019.01)
*G06V 10/40* (2022.01)
*G06V 10/22* (2022.01)
*G09B 19/16* (2006.01)

(52) U.S. Cl.
CPC .............. *G06T 7/0002* (2013.01); *G06T 7/30* (2017.01); *G06V 10/235* (2022.01); *G06V 10/40* (2022.01); *G09B 19/167* (2013.01); *G06Q 10/103* (2013.01); *G06T 2200/24* (2013.01); *G06T 2207/20081* (2013.01); *G06T 2207/20104* (2013.01)

(56) References Cited

U.S. PATENT DOCUMENTS

| | | | |
|---|---|---|---|
| 2017/0308800 A1* | 10/2017 | Cichon | G06N 20/00 |
| 2020/0273552 A1* | 8/2020 | Wolf | A61B 34/30 |
| 2021/0174962 A1* | 6/2021 | Hill, Jr. | G16H 15/00 |

* cited by examiner

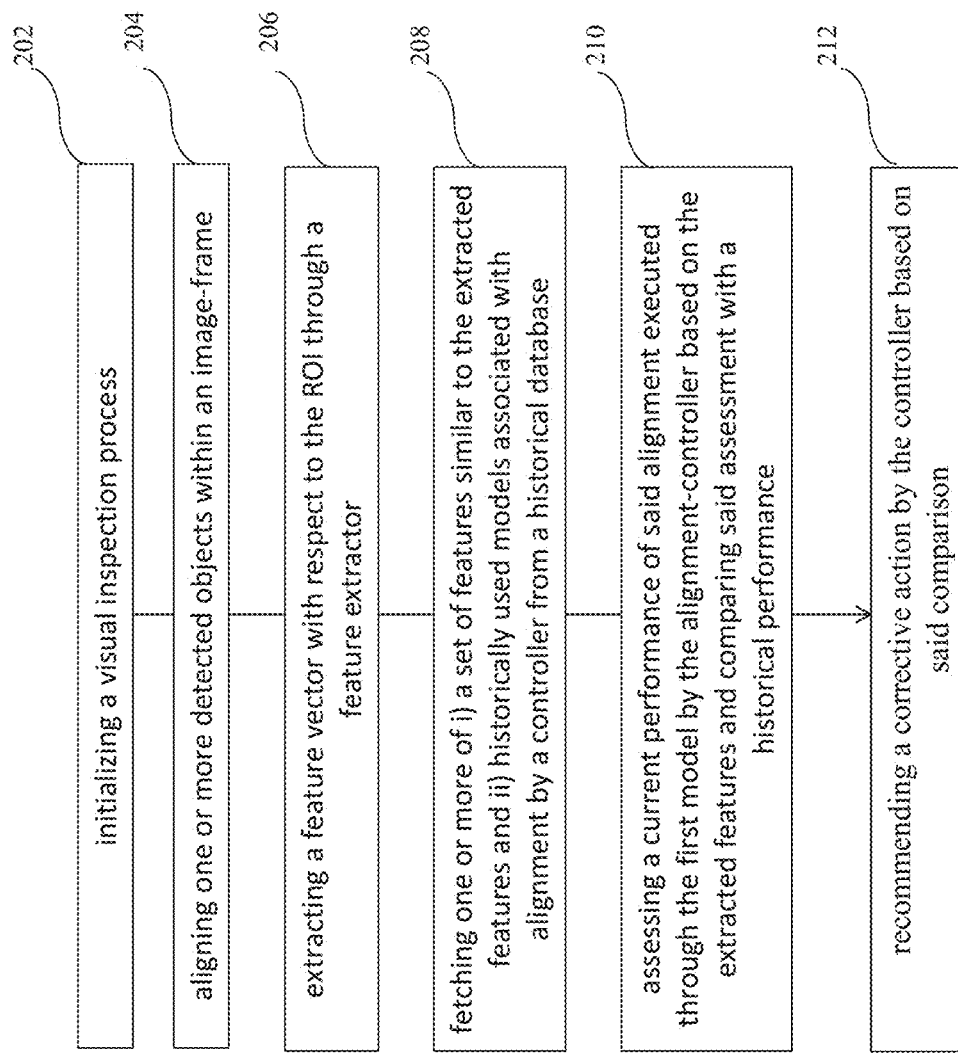

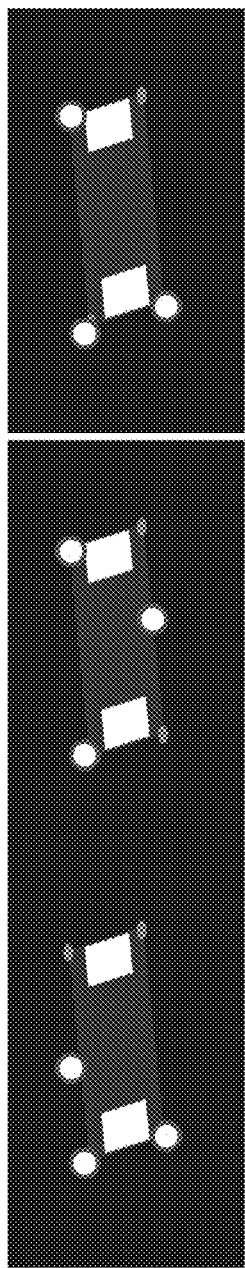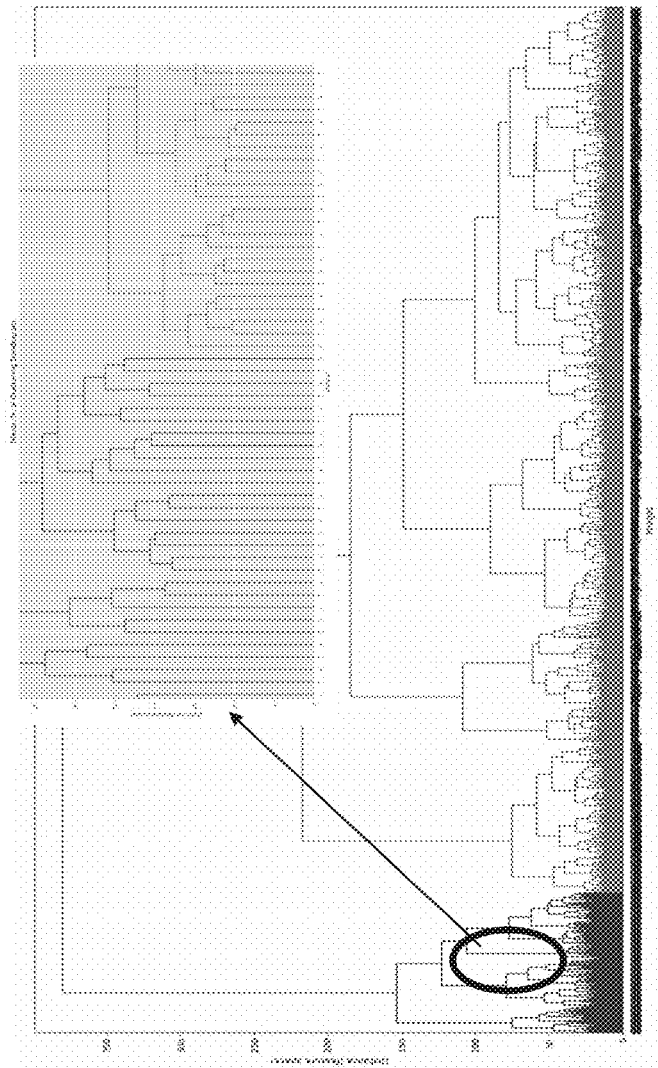
Fig. 9A
Fig. 9B

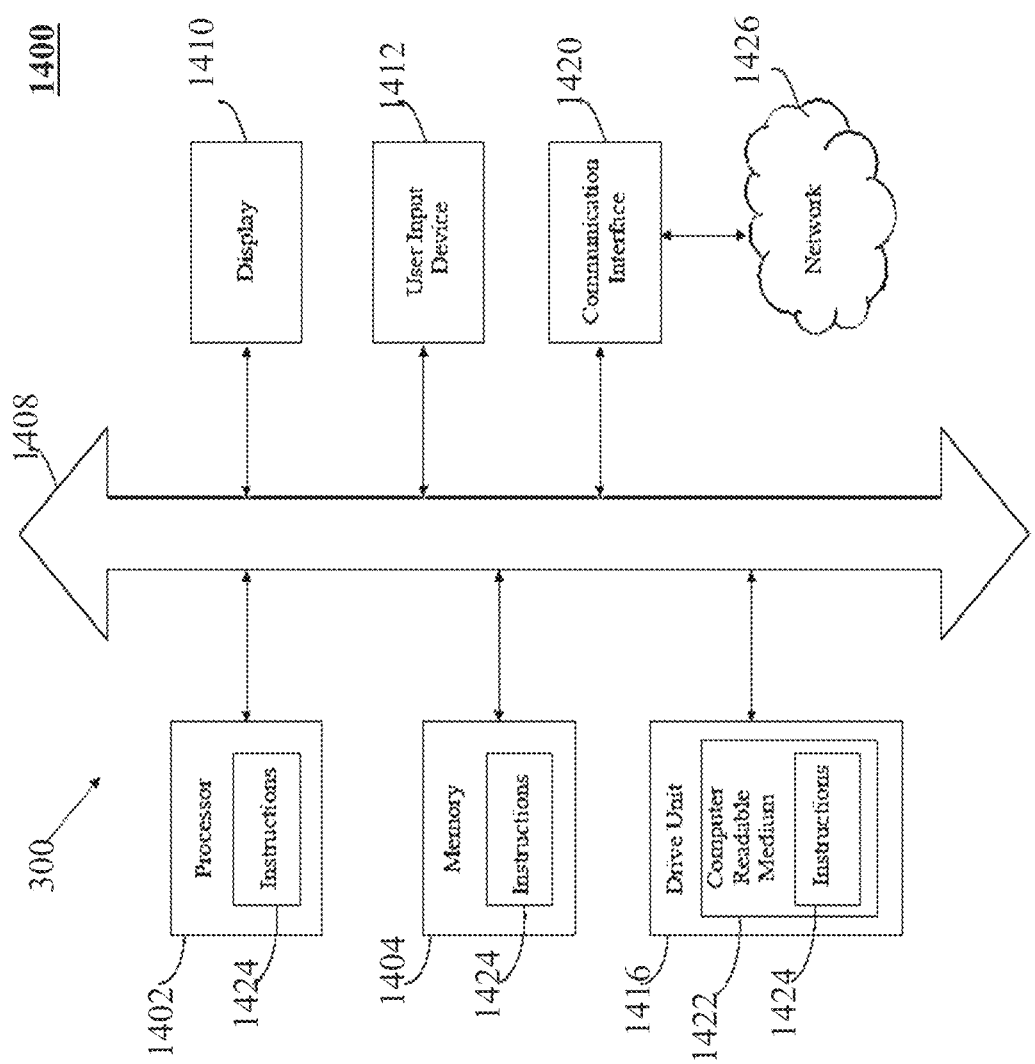

METHOD FOR DEVELOPING MACHINE-LEARNING BASED TOOL

TECHNICAL FIELD

The present invention generally relates to multimedia data classification, specifically towards creating a machine-learning (ML) based model for said classification.

BACKGROUND

Of late, it is getting increasingly necessary to achieve artificial intelligence driven solutions and programs such as AI driven visual-inspection mechanisms to be more easily accessible and faster to develop. This demand at least stems from strain and constraints associated with manpower resources during project based development. As shown in the FIG. 1A, a typical process-flow involves receipt of project-request and deputation of engineer or professional. Thereafter, the AI visual inspection model is developed and resulting code is deployed.

At every stage of the project development, there lies at least a constraint of time inefficiency. An operator has to explore every method to choose a method and setting with respect to operation of each stage. Given the diversity of the options, exploration of options at every stage proves time inefficient.

As shown in FIG. 1B, development of customized-solution of an example AI visual inspection development activity is performed under diverse phases of a project. The diverse phases correspond to modules that are sequentially linked, i.e. initialization of input dataset, annotation of data set, alignment of input data set, feature extraction, ML training, etc. As indicated in FIG. 1A, based on separate timelines associated with each module, a typical time duration expended to render AI algorithm is 2-3 months.

At least a reason as may be attributed to such long timeline is nature of customization. In absence of any unified and universal source code, a final developed AI model becomes diversified as it undergoes various stages of development in the pipeline as depicted in FIG. 1B. Accordingly, the overall development through the pipeline is substantially slow going by the current industry standards, which in turn constrains the manpower by maintaining them engaged over the same tasks for a long period of time and in turn adversely affects the organization's growth and expansion plans.

At least in order to offset the aforesaid time constraint posed by state of the art and achieve a better time efficiency, machine learning expert needs to be deployed that may select the right options at the right stage based on their intellect and past experiences. However, given the shortage of skilled manpower the same itself is a challenging as well as cost ineffective approach.

There lies at least a need to improvise the process at modular level by at least detecting the historical behavior of the pipeline corresponding to various-stages and thereby aid the user or operator with respect to every ML stage during the project development.

There lies at least a need to expedite the process at the granular level in the pipeline to achieve an overall time efficiency and an optimized allocation of workforce to execute the AI model development.

There lies at least a need to assist even a non-expert operator with respect to every ML stage during the project development.

Alternatively, there lies a need for enabling a regular engineer to creating and generating an AI model which otherwise requires specific techniques, expertise, and know how to fine tune and adjust the parameters to have AI model with high quality.

SUMMARY

This summary is provided to introduce a selection of concepts in a simplified format that are further described in the detailed description of the present disclosure. This summary is not intended to identify key or essential inventive concepts of the claimed subject matter, nor is it intended for determining the scope of the claimed subject matter. In accordance with the purposes of the disclosure, the present disclosure as embodied and broadly described herein, describes method and system for predicting or classifying a condition of any material or object or any feature/attribute related to the material/object either in a fully automated environment or through a semi-automatic mechanism that involves external feedback from a living-being (operator) in the environment.

The present subject matter refers developing machine-learning (ML) based tool for visual inspection. The method comprises initializing a visual-inspection process based on one or more selected image defining an input dataset. The historical data similar to the input data set is fetched from a historical database, for example, through a clustering-criteria. At least one historically used model associated with the visual inspection is identified based on the fetched historical data set. Based thereupon a controller recommends one or more of a plurality of methods and a control-setting associated with the identified model for the visual inspection process to a user. Such recommendation is defined in respect of one or more of: a recommended alignment method and a dataset for training the alignment model, a recommended set of features for performing annotation with respect to the aligned images, a recommended region of interest (ROI) and a corresponding feature vector; and a recommended machine learning model or a deep learning architecture for classification. The preceding description related to fetching of historical data may be also construed to cover a scenario wherein a user or the operator resorts to a manual selection of the datasets. Likewise, the present subject matter is not limited to clustering based technique for automatic fetching and may be construed to cover other state of the art automatic/semi-automatic or manual operation for fetching similar dataset.

In other embodiment, the present subject matter refers a method for developing machine-learning (ML) based tool for visual inspection. The method comprises initializing a visual inspection process based on one or more selected image defining a dataset. One or more detected-objects are aligned within an image-frame in relation to said at-least one image based on a first model to generate at least one aligned-image. A plurality of features are extracted with-respect to the aligned-images through a feature extractor. One or more of i) a set of features similar to the extracted features and ii) historically used models associated with alignment are fetched by a controller from a historical database through a technique such as a clustering criteria. In other example, the fetching may be manual selection done by user. A current performance of said alignment executed through the first model is assessed by the alignment-controller based on the extracted features. Such assessment is compared with a historical performance associated with the fetched set of features and/or historically used models. Based thereupon, the controller recommends a corrective-action by the controller based on said comparison to achieve one or more of: a preferred alignment model and a dataset for training the preferred alignment model, at least a portion of the image for usage as template, a set of features for performing annotation with respect to the aligned images, a region of interest (ROI) and a corresponding feature vector, and a machine learning model or a deep learning architecture for classification.

The objects and advantages of the embodiments will be realized and achieved at-least by the elements, features, and combinations particularly pointed out in the claims. It is to be understood that both the foregoing general description and the following detailed description are representative and explanatory and are not restrictive of the invention, as claimed.

BRIEF DESCRIPTION OF THE DRAWINGS

Further, skilled artisans will appreciate that elements in the drawings are illustrated for simplicity and may not have been necessarily been drawn to scale. For example, the flow charts illustrate the method in terms of the most prominent steps involved to help to improve understanding of aspects of the present invention. Furthermore, in terms of the construction of the device, one or more components f the device may have been represented in the drawings by conventional symbols, and the drawings may show only those specific details that are pertinent to understanding the embodiments of the present invention so as not to obscure the drawings with details that will be readily apparent to those of ordinary skill in the art having benefit of the description herein.

FIG. 2 illustrates method steps in accordance with the embodiment of the present disclosure;

FIG. 9A and FIG. 9B illustrate an example alignment tool and annotation system, in accordance with another embodiment of the present disclosure;

FIG. 14 illustrates an implementation of the system as illustrated in preceding figures in a computing environment, in accordance with another embodiment of the present disclosure.

Figure 1A:
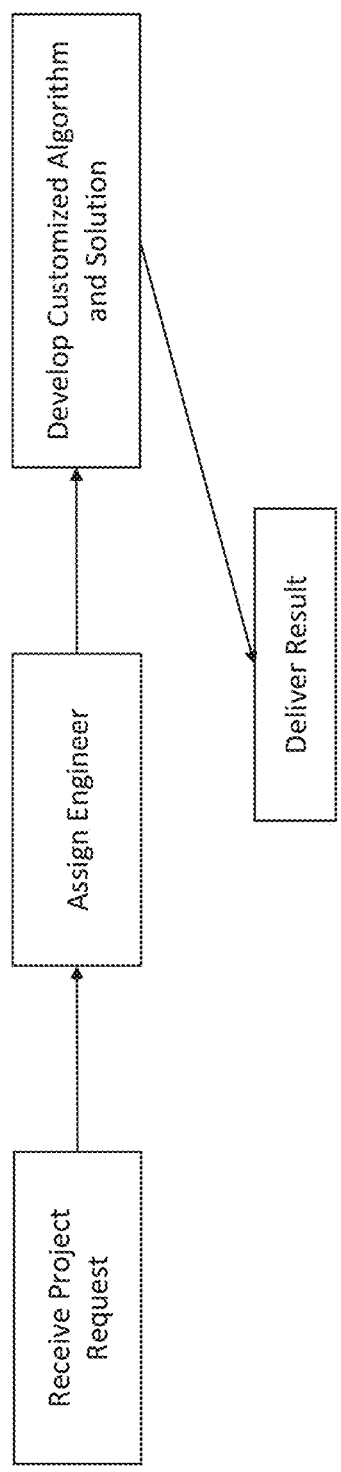
FIG. 1A and FIG. 1B illustrate a state of the art scenario.
Figure 1B:
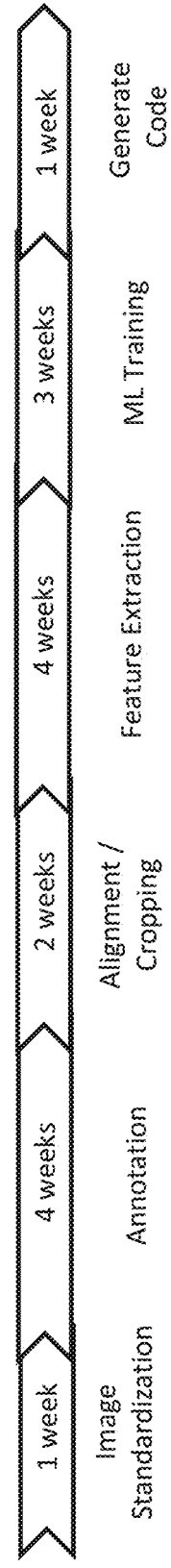

The elements in the drawings are illustrated for simplicity and may not have been necessarily been drawn to scale. Furthermore, in terms of the construction of the device, one or more components of the device may have been represented in the drawings by conventional symbols, and the drawings may show only those specific details that are pertinent to understanding the embodiments of the present disclosure so as not to obscure the drawings with details that will be readily apparent to those of ordinary skill in the art having benefit of the description herein.

DETAILED DESCRIPTION

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates.

It will be understood by those skilled in the art that the foregoing general description and the following detailed description are explanatory of the invention and are not intended to be restrictive thereof.

Reference throughout this specification to "an aspect", "another aspect" or similar language means that a particular feature, structure, or characteristic described in connection with the embodiment is included in at least one embodiment of the present invention. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list, of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skilled in the art to which this invention belongs. The system, methods, and examples provided herein are illustrative only and not, intended to be limiting.

Embodiments of the present subject matter are described below in detail with reference to the accompanying drawings.

FIG. 2 illustrates a method for developing machine-learning (ML) based tool for visual inspection. The method comprises initializing (step 202) a visual-inspection process based on one or more selected-image defining a dataset. Thereafter, one or more detected objects are aligned (step 204) within an image-frame in relation to said at least one image based on a first model to generate at-least one aligned-image. A plurality of features are extracted (step 206) with respect to the aligned-images through a feature extractor. Further, or more of i) a set of features similar to the extracted features and ii) historically used models associated with alignment are fetched by a controller from a historical-database through criteria such as a clustering criteria. However, the present subject matter is not limited to clustering based technique for automatic fetching and may be construed to cover other state of the art automatic/semi-automatic or manual operation for fetching. The fetching may be also a manual selection by a user.

A current performance of said alignment, executed through the first model by the alignment-controller is assessed (step 208) based on the extracted features and comparing said assessment with a historical performance associated with the fetched set of features and/or historically-used models. A corrective action is recommended (step 210) by the controller based on said comparison to achieve at least one of:
- a preferred alignment model and a dataset for training the preferred alignment model;
- at least a portion of the image for usage as template;
- a set of features for performing annotation with respect to the aligned images;
- a region of interest (ROI) and a corresponding feature vector; and
- a machine learning model or a deep learning architecture for classification.

Further, the method comprises generating at least one type of AI code to execute a machine-learning driven based inference process for visual inspection. The generated AI code is analyzed for detecting the inference time by a code deployment controller. Historically, successful actions associated with correction of the inference time are extracted by the code deployment controller, said actions defined by, for example, reducing a number of parameters associated with an M.L model, varying alignment method, reducing feature space, and recommending one or more of said corrective action to update the inference time as determined with respect to the code. In other example, the code-deployment controller recommends optimization of a processing speed of the visual inspection process without having the operator to exercise various options. The recommendation may be in terms of parallelization based on computing device specifications and previously similar-models. Examples of parallelization based recommendation include how many processors should be allocated to various stages such as alignment, feature extraction and machine learning inference of the visual inspection process. In other example, the code-deployment controller as a part of recommendation may also prompt the operator if it detects that historical models were deployed on further advanced computing systems to reach a targeted speed.

In an implementation with respect to an annotation stage, the method comprises receiving one or more of user-defined/semi-autocratic or automatically-defined annotation through a GUI based annotation tool in respect of the aligned images. The labelled data set or a relabeled data set is considered by an annotation controller and based thereupon a similar dataset is fetched from the historical database through criteria which may be, for example, a clustering criteria. A performance with respect to said labelled dataset is assessed by the annotation-controller and such assessment is compared with a historical performance associated with the fetched similar dataset from database. The fetching may be also construed to cover a scenario wherein a user or the operator resorts to a manual selection of the datasets. Likewise, the present subject matter is not limited to clustering based technique for automatic fetching and may be construed to cover other state of the art automatic/semi-automatic or manual operation for fetching similar dataset. Further, the method comprises recommending a corrective-action by the annotation controller as one or more of: a) recommending a set of features and b) dimension-reduction in latent-space with respect to the set of features at least based on principal component analysis.

In an implementation with respect to feature extraction stage, a region of interest (ROI) is defined with respect to the aligned image through a second model. The ROI is automatically selected or manually selected. A plurality of features with respect to the ROI are extracted through a feature-extractor for providing a feature vector for an ML training module. The extracted features pertaining to the ROI are considered by a data feature controller while fetching the set of features and/or historical models similar to the extracted features from the historical database. A performance by the data feature controller is assessed based on the extracted features, and said assessment is compared with a historical performance associated with the fetched set of features. Accordingly, a corrective action is recommended by the data feature controller based on said comparison with fetched features to achieve a preferred ROI shape and location. The corrective action may be for example proposing application of a set of features defined by at least one of average, standard deviation, HOG, LBP and proposing A/B testing in case of presence of a plurality of sets of historically successful features.

In an implementation with respect to selection of a machine-learning model, a selection of at-least a machine-learning classifier is received through an ML training module to operate upon the extracted-features and classify the at least one image with respect to one or more labels pre-defined under a visual-inspection. The selected ML classifier is considered by an ML training controller while fetching a historically used classifier from the historical database. A performance associated with the selected classifier is assessed by the ML training controller with a historical performance associated with the fetched classifier, and a corrective action is recommended by the ML training controller based on said comparison with fetched classifier. The fetching may be also construed to cover a scenario wherein a user or the operator resorts to a manual selection of the historical classifier. Likewise, the present subject matter is not limited to clustering based technique for automatic fetching and may be construed to cover other state of the art automatic/semi-automatic or manual operation for fetching the classifier. The corrective action may be a recommendation of historically successful structures in respect of ML models. In other example, the corrective action may be recommending a plurality of architectures for A/B testing in respect of deep learning architecture.

Figure 3:
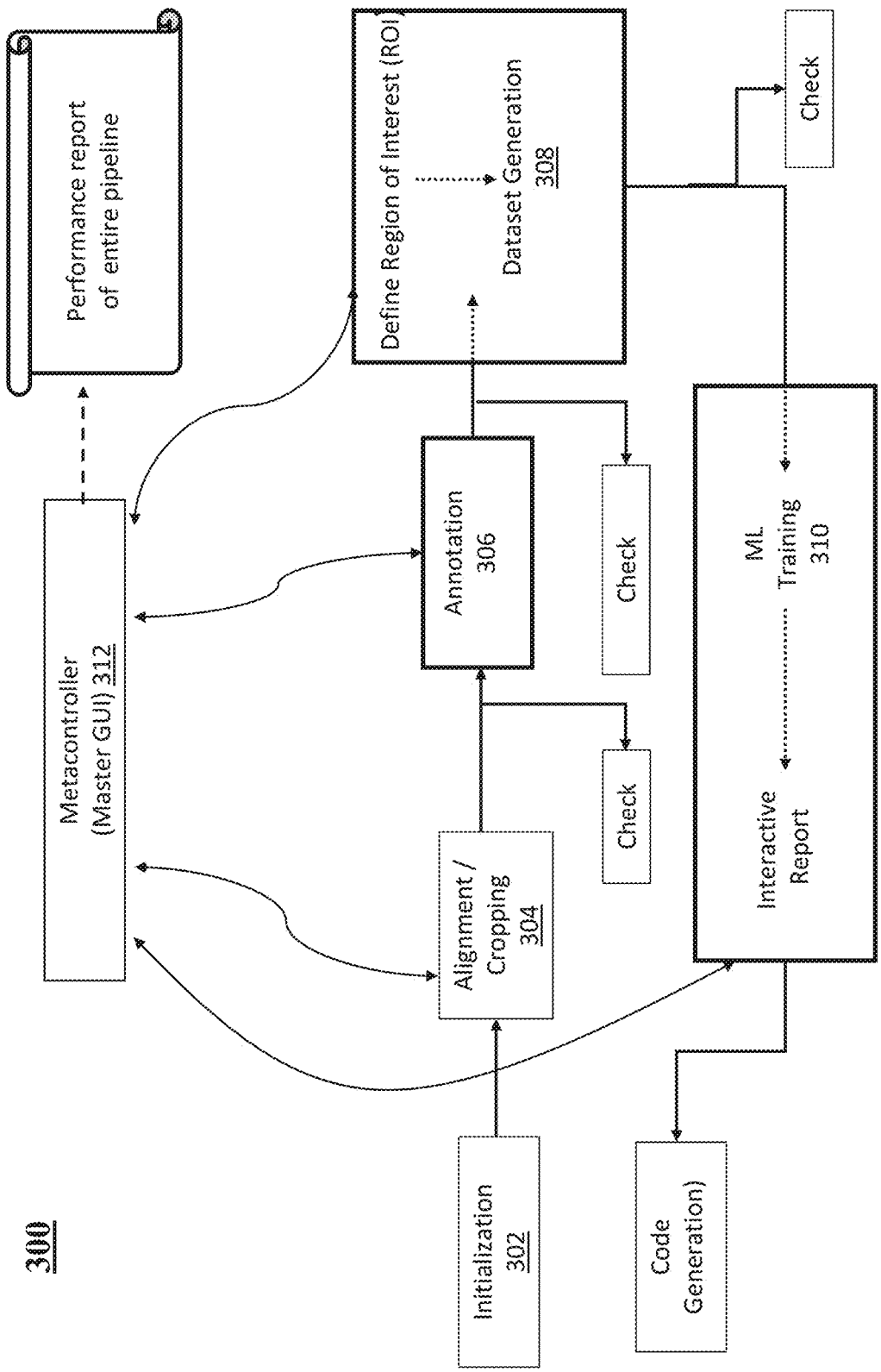
FIG. 3 illustrates a system architecture based on the method of FIG. 2, in accordance with an embodiment of the present disclosure.

FIG. 3 illustrates a schematic-architecture or a system 300 for developing machine-learning (ML) based tool for visual inspection in a computing environment. The system 300 comprises an initialization module 302 for step 202, an alignment module 304 for step 204, an ROI selector 308 for steps 206, and a metacontroller 312 for managing the execution of the steps 208 until 210 of FIG. 2. Further, the system comprises an annotation tool, and an ML training module selector 310. Each of said module may be provided with a communication-interface and GUI for executing the method steps based on a user-provided input or trigger.

Each of the module (e.g. Alignment, Annotation, Etc.) may have their respective internal-functions that correspond to its task and role to perform specific action within a pipeline of the visual inspection process. In an example, the alignment method aligns images, annotation tool is used to label data, and so on. In an example, each module may utilize proprietary technology and is designed to be automated/semi-automated to assist with a user. Such internal functioning may be controlled by individual-controllers, models and respective user-interfaces that are in turn controlled and orchestrated by the metacontroller 312.

Further, for each of the module, upon completion of action, the system 300 will also generate a performance report based on statistical calculation to assess how well the module perform its task (e.g. how well the system does the alignment, etc.). While each module may have different calculation methods, but it may be based on statistical analysis. This performance report is shared and reported back to metacontroller 312 to keep track of module performance. As an example, the Machine Lea module 310 reports performance in terms of metrics such as accuracy, recall, precision and so on as well as computation time.

Further, each module has its performance report. If the final performance report rendered by the metacontroller 312 is not satisfactory, the metacontroller 312 may pull and refer the entire performance report along the pipeline (modules 302 until 310 and 314) to diagnose and detect as to which step/module is underperforming (the weakest link) and report this to the user to take specific corrective action or pursue a recommended corrective action. This can be done to speed up inference as well by pointing out which component/module is computationally expensive.

Further, as a part of conducting A/B testing, the metacontroller 312 accesses entire information pertaining to each module (302 until 310 and 314) and conducts the performance of the testing if a specific module configuration is changed. In an example, the metacontroller 312 can draw performance comparisons in respect of user-selected alignment method with some other alignment method, i.e. Alignment method A compared to alignment method B, etc. At least a benefit is that A/B testing may be conducted while considering the full pipeline 302 until 310 and 314 not just the individual performance.

Figure 4:
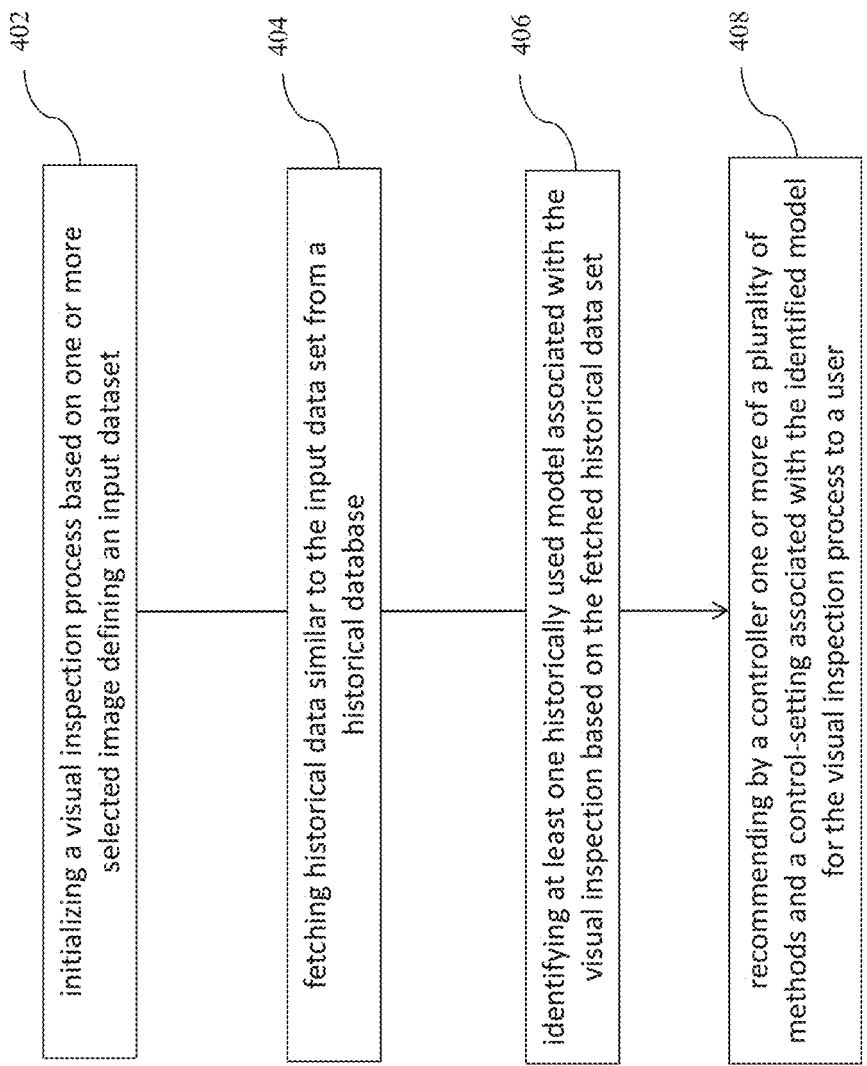
FIG. 4 illustrates method steps in accordance with the embodiment of the present disclosure.

FIG. 4 illustrate a method for developing machine-learning (ML) based tool for visual-inspection in accordance with another embodiment of the subject matter. The method comprises the steps of initializing (402) a visual inspection process based on one or more selected image defining an input dataset.

Further, the historical data similar to the input data set is fetched (step 404) from a historical database through a criteria such as clustering criteria. In other example, other semiautomatic or manual selection based criteria may be selected for fetching similar data sets. Such fetching of the historical data similar to the input data set is based on analysis of the input dataset in respect of one or more of an object shape, statistical features, and statistical differences among classes to the input dataset.

Further, the method comprises identifying (step 406) at-least one historically used model associated with the visual inspection based on the fetched historical data set. The fetching may be also construed to cover a scenario wherein a user or the operator resorts to a manual selection of the model. Likewise, the present subject matter is not limited to clustering based technique for automatic fetching and may be construed to cover other state of the art auto automatic/semi-automatic or manual operation for fetching. Further, the method comprises recommending (step 408) by a controller one or more of a plurality of methods and a control-setting associated with the identified model for the visual-inspection process to a user. The recommendation is defined in respect of one or more of:

a recommended alignment method and a dataset for training the alignment model;
 a recommended set of features for performing annotation with respect to the aligned images;
 a recommended region of interest (ROI) and a corresponding feature vector; and
 a recommended machine learning model or a deep learning architecture for classification.

Further, the method comprises determining said identified models as being a plurality of historical models having similar performance records. In respect of said identified models, A/B testing is recommended in respect of said identified models. Such example of A/B testing is defined by allowing operation of each of said plurality of models over the input dataset through respectively associated method and control setting. In other example, A/B testing is defined by depicting a performance comparison of one model with another model in respect of said input.

Further, the method comprises receiving an acceptance from a user in respect of said recommendation of the plurality of methods and the control-setting. Such recommendation is applied in respect of a plurality of stages of visual inspection process upon receiving the acceptance. In case of not receiving the user-acceptance towards said recommendation, the user-provided methods and/or one or more control settings are applied.

Further, the method comprises aligning one or more detected objects within an image-frame in relation to said at least one image based on a recommended method or user selection to generate at least one aligned-image from the input dataset. Based thereupon, one or more aligned images are outputted based on the input data set based on the alignment method.

A current performance of the visual inspection process is assessed by the controller and said assessment is compared with a historical performance. A first type of corrective action is recommended by the controller based on said comparison to achieve an improved performance than the current assessed performance in respect of the visual inspection process.

A second type of corrective action is recommended by the controller for example in terms of reducing a number of parameters associated with an M.L model, varying alignment method, and reducing feature space. A/B testing may be proposed by proposing tests in respect of one or more ML configurations with respect to the visual inspection process. In other example, the corrective action may be a combination of said first and second types of corrective action.

Further, the method comprises generating at-least one type of AI code for deployment on-field to execute a machine-learning driven based inference process for visual inspection. The AI code, a machine-learning configuration associated with the AI code, and a dataset corresponding to the AI code are stored. Further, one or more additional training methods are defined to be pursued for the pre-stored dataset based on the training methods associated with the dataset corresponding to the currently stored AI code.

Further, pre stored AI models are automatically re-trained and tested based on one or more features associated with the current stored AI model to augment a current performance of the visual inspection system and to augment prospective recommendations from the controller.

Figure 5:
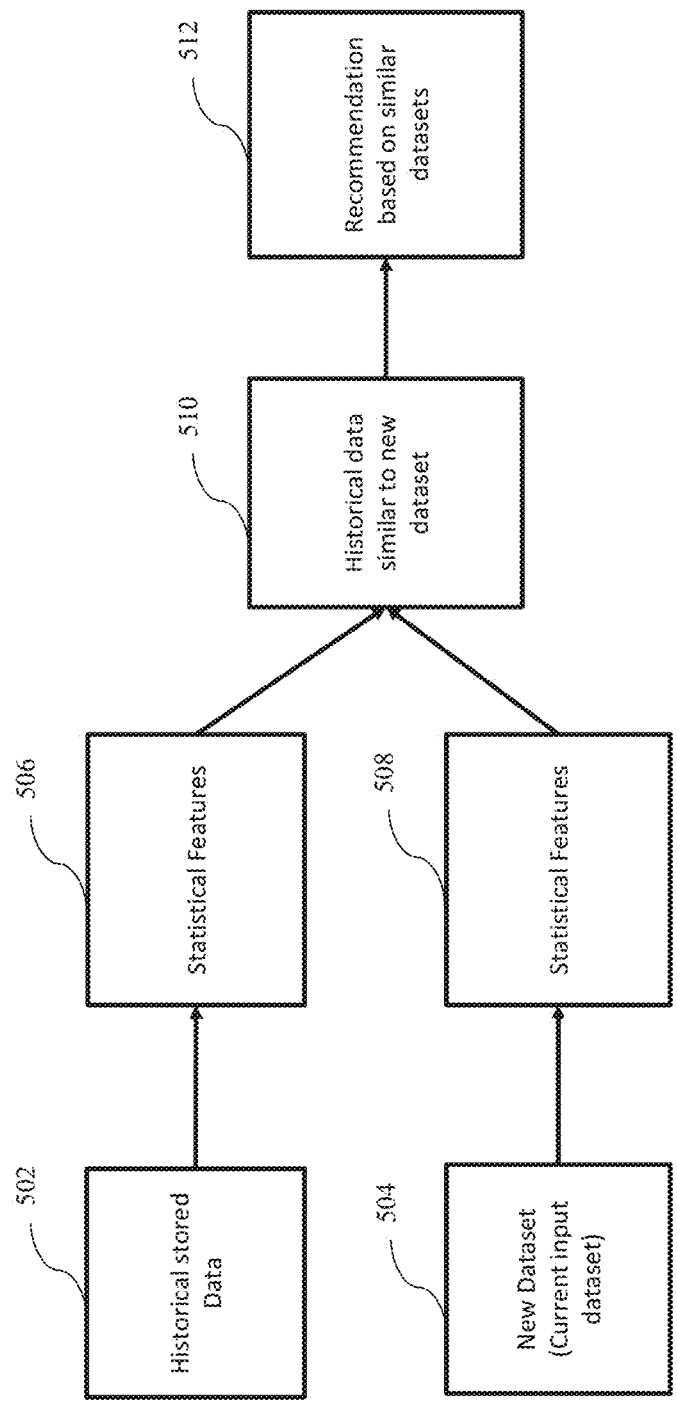
FIG. 5 illustrates a system architecture based on the method of FIG. 4, in accordance with an embodiment of the present disclosure.

FIG. 5 illustrates a mechanism for rendering recommendation in accordance with an embodiment of the present subject matter.

More specifically, at each step the metacontroller 312 analyzes the object shape, overall statistical features 506, 508, statistical-differences between the classes. Such features are used to retrieve the most similar datasets from a historical database, for example, based on a clustering-criteria such as k nearest neighbor (kNN).

The present implementation is at least based on the fact that the historical-data 502 in the present implementation is used to speed up problem-solving in case of substandard performance expected from an existing dataset. Each time a new model is trained, its performance is added to the database and accordingly a new dataset 504 used is mapped with performance. An example clustering method such as kNN is used to retrieve the most similar historical data based on said performance. However, the present subject matter is not limited to clustering based technique for automatic fetching and may be construed to cover other state of the art automatic/semi-automatic or manual operation for fetching similar dataset.

Based on similarity quotient (e.g. based on the clustering-distance), the retrieved and similar dataset is then used to make suggestions/recommendation 512 either in accordance with embodiment referred to in FIG. 4 or the embodiment referred in FIG. 2.

Figure 6:
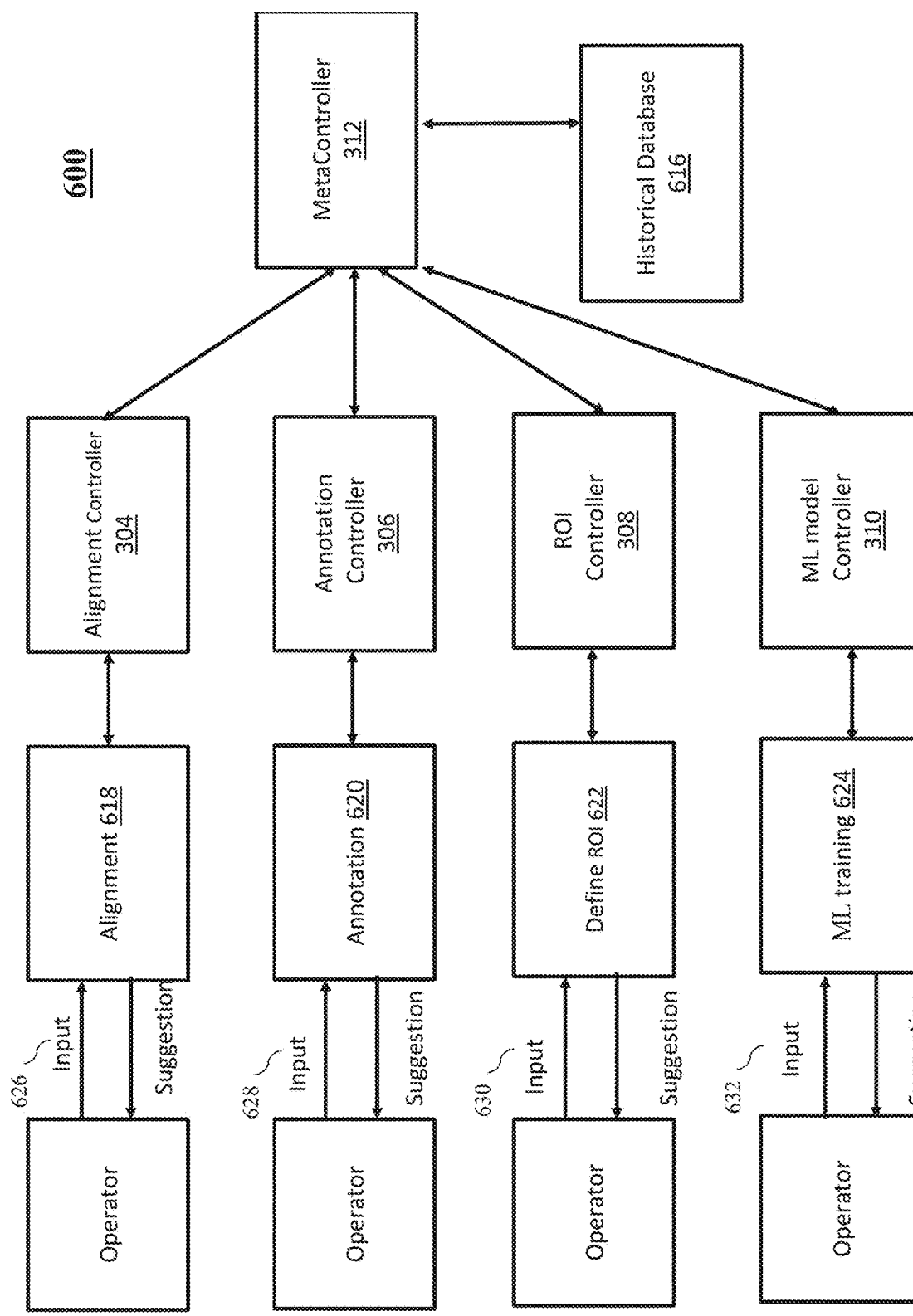
FIG. 6 illustrates an example implementation of method steps of FIG. 4, in accordance with another embodiment of the present disclosure.
Figure 8:
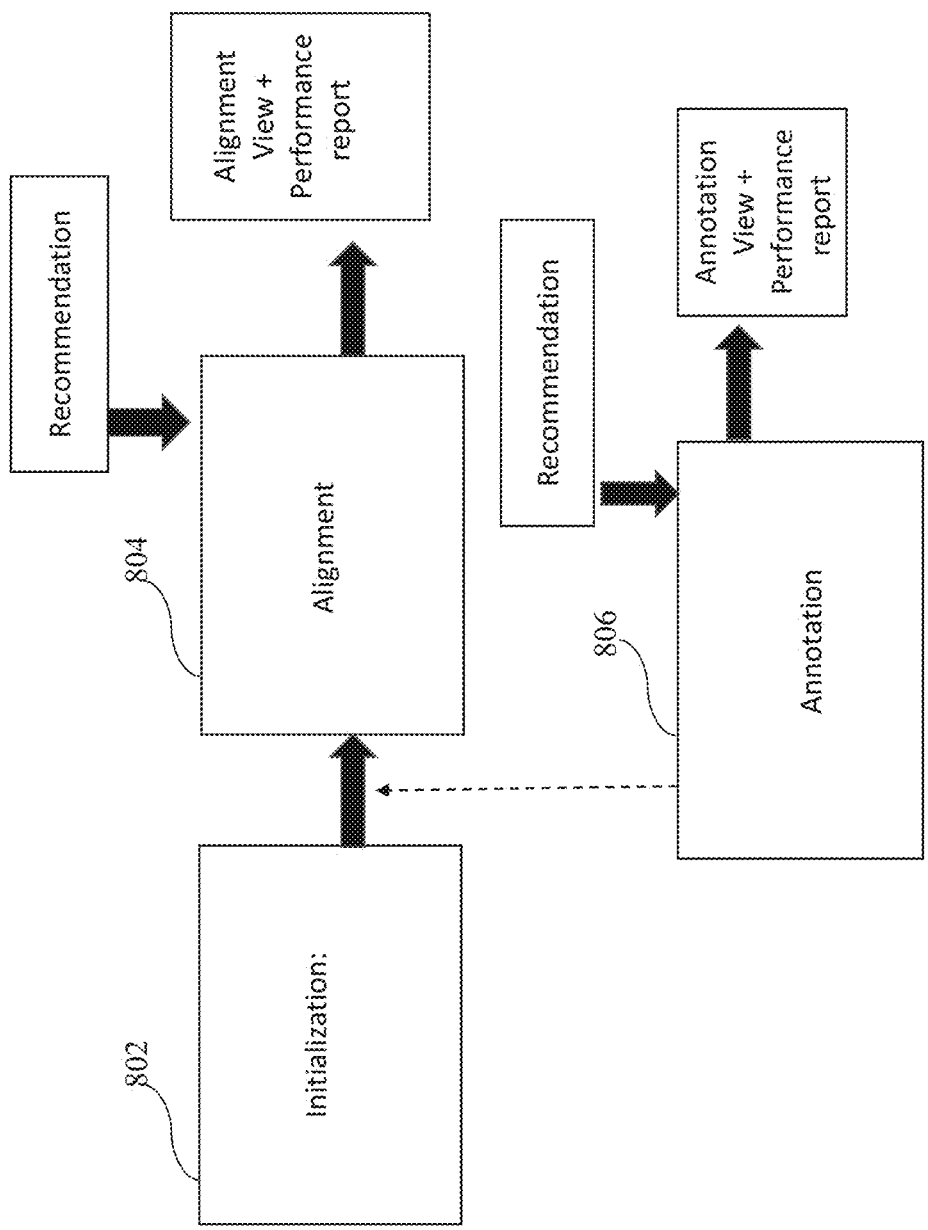
FIG. 8 illustrates another example implementation method steps of FIG. 2 and FIG. 4, in accordance with another embodiment of the present disclosure.
Figure 10:
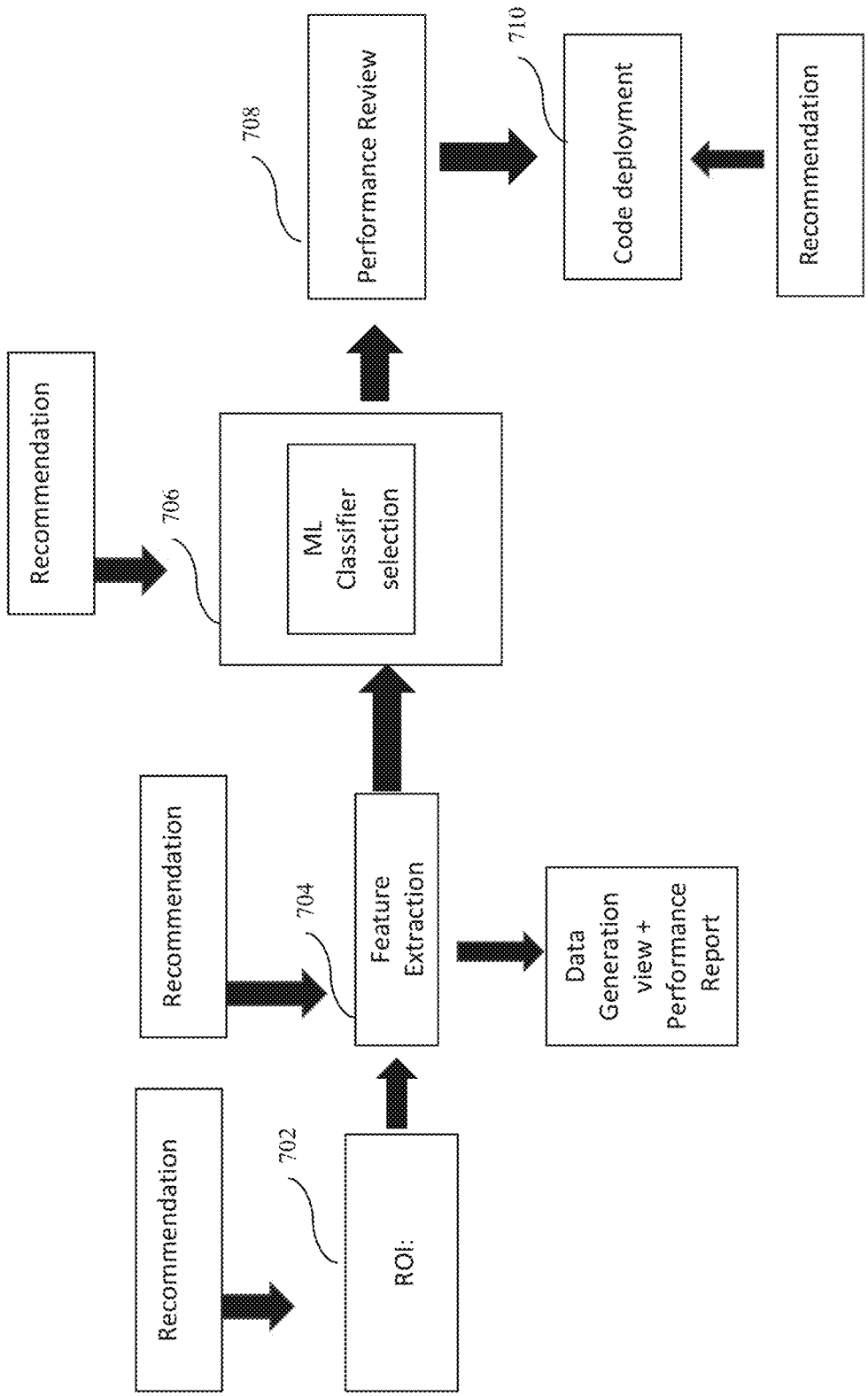
FIG. 10 illustrates another example implementation method steps of FIG. 2 and FIG. 4, in accordance with another embodiment of the present disclosure.

In addition, the methods and control settings to be employed upon the retrieved dataset for each stage are proposed in accordance with FIG. 6, FIGS. 8 and 10. Further, upon the final generation of deployment code, the data is stored as the history to act as historical data 510 for further usage. Moreover, existing or historical datasets can be re-trained with the new deployed method for the latest deployed code. Each new-model not only add itself to the history but also improve/test performance on all the similar items automatically FIG. 6 illustrates an operation of metacontroller for rendering recommendation in accordance with an embodiment of the present subject matter. The metacontroller 312 is connected to a historical database 616 for retrieving most similar dataset.

With respect to the alignment stage 618, an alignment-controller 304 receives the input data set 626 as initialized. Based on said received input data set 626, the metacontroller 312 recommends various alignment methods to choose from: template matching, Hourglass, and so on. The metacontroller 312 suggests the most successful methods and help user set some parameters. For instance, which part of the image to use as template. If more than one method was successful in the past A/B tests are automatically proposed.

With respect to the annotation stage 620, an annotation controller 306 receives aligned-image outputted from the alignment method performed over input data set 628. Based on said aligned images, the metacontroller 312 recommends a set of features to build an annotation system and clusters for annotation, a set of features for usage in respect of an annotation system for annotation, and dimension-reduction in latent-space with respect to the set of features. In an example, the system suggests a set of features as well as whether to use principal component analysis (PCA) or not.

With respect to defining ROI stage 622, the ROI controller 308 receives the aligned images outputted from the alignment method performed over input data set. Optionally, a labelled dataset associated with the aligned images is also obtained from an annotation tool along with aligned images. Based thereupon, the metacontroller recommends a preferred ROI and a corresponding location, a set of features corresponding to the recommended ROI; and A/B testing in case of presence of a plurality of sets of historically successful features.

In an example, the metacontroller 312 suggests potential ROI shape and location. The metacontroller 312 renders automatic features engineering and testing. In an example, the metacontroller recommends best candidates based on previously build model such as HOG, LBP, GABOR, avg, std as statistical features. If different sets of features were successful in the past, A/B tests are automatically proposed. Specifically, as a part of A/B testing, the metacontroller suggests A/B testing amongst the features and ROI.

With respect to ML training module stage 624, the feature vector with respect to the aligned images is received by an ML training module controller 310 to classify the at least one image with respect to one or more labels pre-defined under a visual-inspection. Based on the received feature, the metacontroller 312 recommends historically used structures and/or features in respect of ML models. In respect of deep Darning architectures, the metacontroller 312 recommends one or more corresponding architectures for A/B testing.

In an example, the metacontroller 312 suggests the best models and structure from previous experience (e.g. Random Forest, XGBoost etc.). In case of Deep Learning, the metacontroller automatically proposes multiple types of network CNN, multiple architectures. The metacontroller 312 recommends network type and architectures some candidate architectures for A/B testing.

Specifically, as a part of A/B testing, the metacontroller 312 suggests A/B testing amongst the features and ROI for classic A.I. and non-deep learning based ML models. In respect of deep learning, the metacontroller suggests A/B testing amongst the different deep learning architectures. In yet another example, the metacontroller suggests A/B testing amongst the features, the ROI, and the deep learning architectures.

Figure 7:
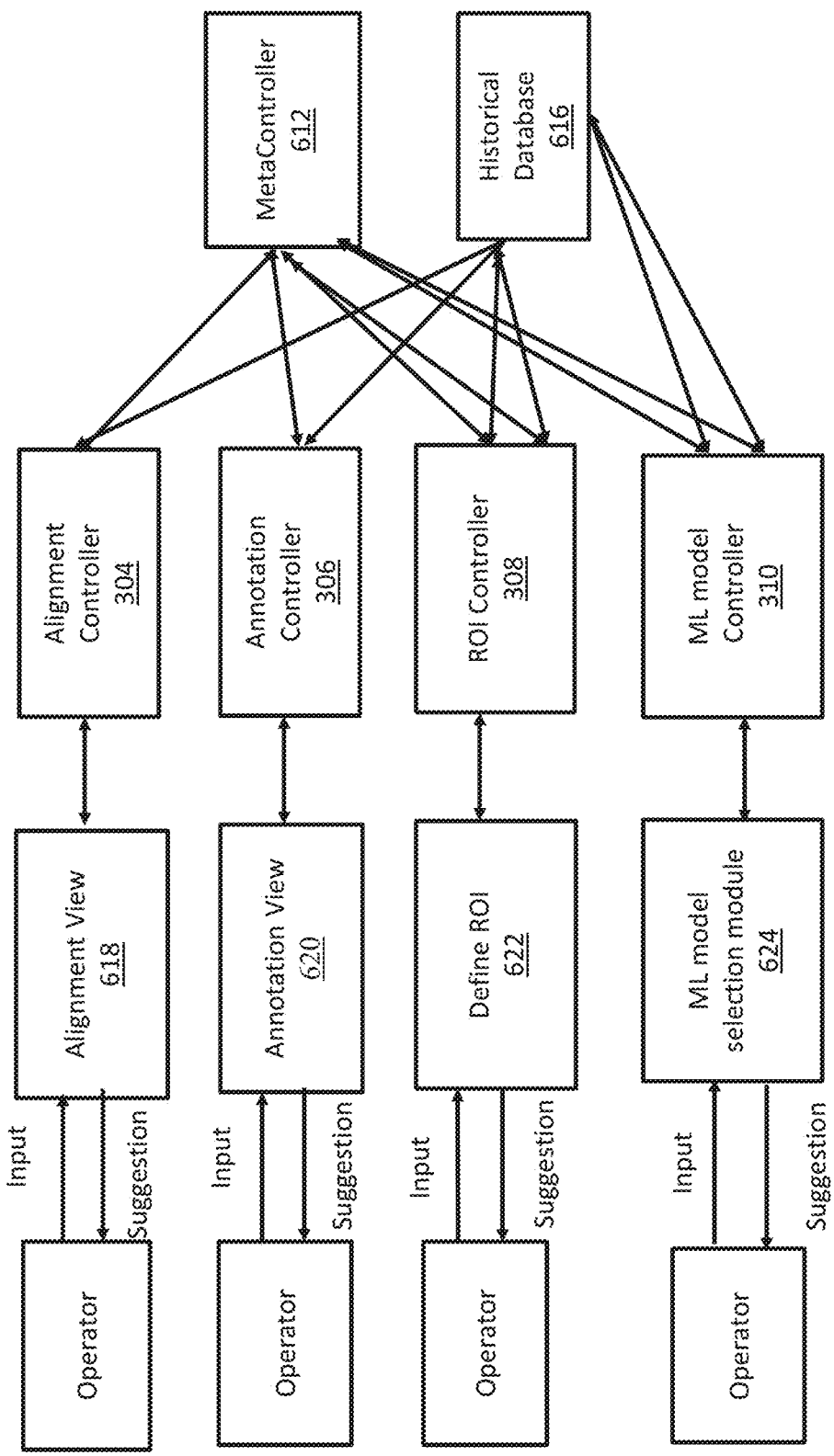
FIG. 7 illustrates an example implementation method steps of FIG. 4, in accordance with another embodiment of the present disclosure.

FIG. 7 illustrates an example implementation of FIG. 6 wherein in a case wherein the historical database of datasets interacts directly with sub-controller (i.e. the alignment controller 304, the annotation controller 306, the ROI controller 308, the ML training controller 310 etc) instead of the metacontroller. The present embodiment renders benefit especially when the dataset grows larger. The sub-controller (e.g. alignment controller) 304 are able to pull similar datasets in regards to specific part of the pipeline using features relevant to this specific part (e.g. alignment stage). Alternatively, each sub-controller acts as a dedicated recommender system for a stage. They may all be based on for example kNN clustering. However, other different distance-metrics may also be construed to be used for clustering. At least as a result of the individual recommender systems, part recommendation can also be made, in case the historical data shows that historical data based recommendation may not be fit for entire pipeline and may hold beneficial for only a part of the pipeline or in the other words selected stages in the pipeline.

FIG. 8 illustrates example process steps initialization and alignment-models for facilitating image-inspection.

At step 802, which corresponds to initialization or step 202, a GUI may be provided to initiate process. Through the present step 802, a high level information as a part of initial configuration is passed along to next-step in pipeline. As a matter of rendering high level information, the user may provide path to dataset, data labelling, classes, type of problems to be solved. More specifically, the operator indicates data path, labels and type of problem e.g. binary vs I class vs clustering. In an example, the present step 802 may be defined under following sub-steps:
  A) Define folder paths.
  B) Initiate the process.
  C) Check Image Distribution.
  D) Choose Image standardization method as a part of image pre-processing for visual inspection At step 804 which corresponds to alignment or step 204, a semi-automatic or fully automatic alignment method may be chosen by the operator or based on the recommendation rendered in FIG. 9A to align and check alignment of input images. An auto-alignment checking tool may be provided to evaluate the alignment as Ok or Not OK. The user can also select multiple options for A/B testing among the applicable alignment methods. Thereafter, the aligned dataset is passed along to next step in pipeline.

As a part of optional step 806 which corresponds to step 206, labelling of aligned image from the step 804 or the input data set from step 802 may be performed using a graphical tree representation such as dendogram (as depicted in FIG. 9B). The operation may be performed by the user based on the recommendation rendered in FIG. 6. More specifically, the present step 806 receives path to aligned dataset from step 804, prior information about classes from step 802, and accordingly sends labelled dataset and performance results. However, other state of the art annotation systems may be construed to execute instead of the dendrogram based annotation system.

Each of the steps 804 and 806 also render a performance report for review and operation by the operator or user.

FIG. 9A illustrates an example of semi-automatic image alignment process as corresponding to step 804. The same refers to a general purpose alignment-tool to align any type of object. As shown in FIG. 9A, the user only needs to annotate small number of images (for instance 3 figures) by choosing specific landmark points. The annotation tool will start data augmentation e.g. by rotating, shifting, and changing the aspect ratio of objects, and generate a plurality of images (for instance 20 impressions) to train deep learning model. An output image may undergo image alignment quality check and may be categorized as OK to proceed or not good enough.

In another example, Template Matching may be used as a general purpose alignment tool to align any type of object. In an example, user may only need to annotate single object. The annotation tool will check new input image, find similar pattern, and align the new image in accordance to the annotated image.

FIG. 9B refers an annotation tool in accordance with the step 806. The annotation tool receives one or more of a user-defined or automatically-defined annotation through a GUI based annotation tool in respect of the aligned images.

The annotation tool facilitates one or more of a user-defined or automatically defined annotation in respect of the aligned images or the input images. As indicated in FIG. 9B, the annotation tool, for example, utilizes clustering technology to construct dendrogram for image annotation. Accordingly, the tool comprises a first area for depicting a labelled data set through a dendrogram with respect to the aligned images. Another part of a GUI representing the annotation tool comprises a plurality of controls associated with approving and/or relabeling the labelled set.

More specifically, the first area depicts a labelled data set through an annotation system (e.g. dendrogram) with respect to the aligned-images. The annotation system is built in accordance with either a) the recommended set of features and dimension reduction in FIG. 6 or b) user-inputted set of features and dimension reduction. The second area comprises a plurality of controls associated with approving and/or relabeling the labelled set. The annotation system may also be construed to cover other annotation systems apart from dendrogram and may be based on techniques other than clustering. In an example, other analogous techniques apart from clustering may be an anomaly-detection mechanism to annotate dataset. Likewise, the present subject matter may be expanded to cover other state of the art mechanisms for annotating dataset.

However, the present annotation in FIG. 9B can be considered optional and may not be required in a scenario wherein the input dataset comes pre-annotated.

FIG. 10 represents an ROI selector and feature extractor corresponding to steps 208 and 214.

At step 702 which corresponds to step 208, the user selects region of interest (ROI) via manual or based on the recommendation tendered in FIG. 6 and accordingly a specific output is rendered as ROI information which is passed along to next step in the pipeline. Specifically, either the operator selects the ROI or a proposed ROI in accordance with FIG. 6 is rendered. The ROI selector essentially receives path to aligned dataset, labels and sends selected ROI extracted features as a feature vector vide step 704.

At step 704 which corresponds to step 210, Feature Extraction/data set generation takes place. A list of features from the ROI may be generated for machine learning as a part of classic AI based machine learning criteria. Accordingly, the extracted features are passed along to next step in the pipeline. As a part of performance report, the distribution of features as extracted may be compared between OK and Not Good (NG). In an example, a performance notification may be rendered as to whether selected ROI is fit or unfit for usage.

However, in case of deep learning architecture, the present step 704 may be optional and ROI (whether manually or automatically selected) may be directly sent to the next stage in pipeline At step 706 which corresponds to step 212, as a part of Machine Learning or Deep Learning model selection, the user uses GUI to choose classifier and cross validation method. Accordingly, the selected model and performance are passed as output to next stage in the pipeline. Said chosen classifier may be based on the recommendation as tendered in FIG. 6. As a part of reviewing performance, the user uses the GUI to preview result and expected performance. As a part of present step 706, the input is received as dataset, and performance reports from all previous steps In step 708 which corresponds to step 212, as a part of reviewing performance of the selected ML model, the operator selects the models to be tested or receives a recommendation as to which models are appropriate. In an example, the operator may receive a recommendation of Brute Force testing with respect to a particular ML model or two, or altogether a recommendation to select a particular model or two. The operator can perform A/B testing based on the current selected ML model and the previous option In step 710 which corresponds to step 214, after reviewing interactive report in step 708, the user can then choose the specific configuration through the GUI and then generate the code for deployment. In an example, the code may be deployed in python or may be converted into C++ platform for deployment.

Post code-development, in case the inference-time is problematic, the metacontroller automatically extracts past-adopted corrective-actions which may be, for example, reducing the number of parameters of the M.L model, changing the alignment-method, reduce the feature-space etc. The metacontroller recommends relevant-actions to address the problem at the present stage. In other example, the metacontroller recommends optimization of a processing speed of the visual inspection process without having the operator to exercise various options. The recommendation may be in terms of parallelization based on computing device specifications and previously similar-models. Examples of parallelization based recommendation include how many processors should be allocated to various stages such as alignment, feature extraction and machine learning inference of the visual inspection process. In other example, the metacontroller as a part of recommendation may also prompt the operator if it detects that the historical models were deployed on further advanced computing systems to reach a targeted speed.

Figure 11:
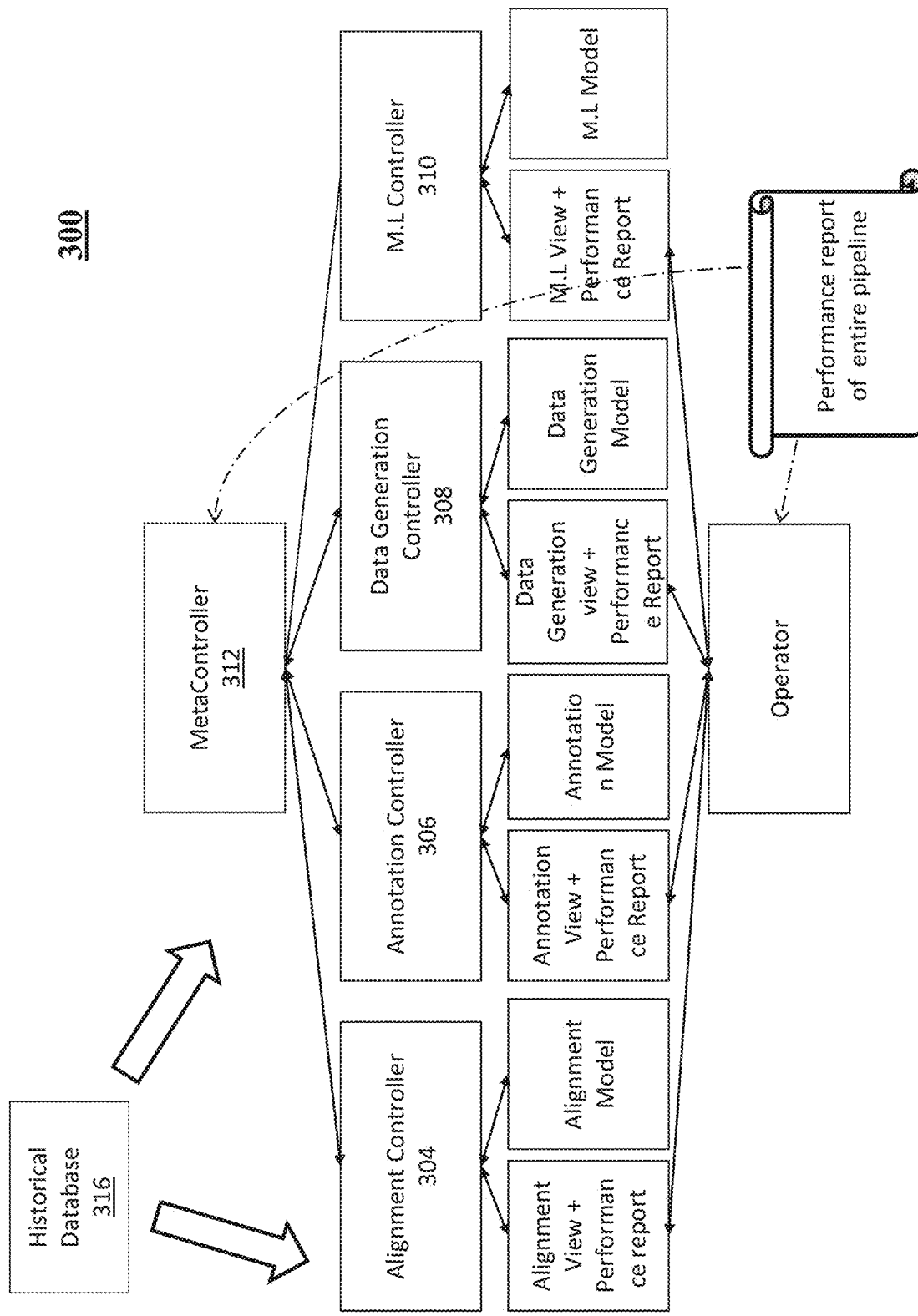
FIG. 11 illustrates an example architecture with respect to the architecture depicted in FIG. 3, 5 and FIG. 6, in accordance with another embodiment of the present disclosure.

FIG. 11 illustrates an example-architecture with respect to the architecture depicted in FIG. 3, in accordance with another embodiment of the present disclosure. As depicted in figure, the metacontroller 312 is connected to each component 304, 306, 308 and 310 to fine tune and adjust the parameters to have the final AI model with high-quality. The metacontroller 312 renders a central communication system that keeps an overview of the full system 300 and leads an operator user at each module 304, 306, 308 and 310.

Each of the modules 304, 306, 308 and 310 share their internal-functioning and performance report with the metacontroller 312. The same at least facilitates diagnostic tools as a part of the GUI depicted in FIG. 8 at the module 308 corresponding to the selection of the M.L stage. Diagnostics are carried out by assessing performance of each module which is reported back to the controller 312 for compilation and displayed within the views as rendered in forthcoming figures.

When operator makes changes/adjustment on each module, the controller 312 can perform A/B Testing as it keeps track of each model performance from each module. In other words, a semi-automatic A/B testing with respect to the alignment methods, clusters, ROI features, the selected ML models or deep learning architectures is facilitated at the respective stages 304, 306, 308 and 310. Accordingly, the user or an operator is allowed to easily test different options at each step through A/B testing and thereby test different pipelines and models.

The operator need not have Machine Learning expertise to control the system 300. The system 300 and metacontroller 312 leads the operator through the various steps and options. Accordingly, the operator and system 300 collaborate to build a best possible model with time efficiency.

Overall, the metacontroller 312 orchestrates a sequential flow of the overall interaction since not all the components are functional everytime. The metacontroller 312 stores the information that needs to be shared across different components (system control flow, various options to be exercised at every module, M.L models to be selected and so on), and allows saving current status, system interruption and re-loading components. Last but not the least, the metacontroller 312 analyses the performance reports (both overall and module-wise) and proposes improvements to the user for troubleshooting. In an example, the metacontroller may suggest a change to the selected ROI upon diagnosing a wrong selected ROI at the ROI selector stage 306. For such purpose, the metacontroller 312 is connected to the historical database 616. As other example corrective action, the metacontroller may also recommend a preferred alignment model and a dataset for training the preferred alignment model, at least a portion of the image for usage as template, a set of features for performing annotation with respect to the aligned images, and a machine learning model or a deep learning architecture for classification.

Figure 12:
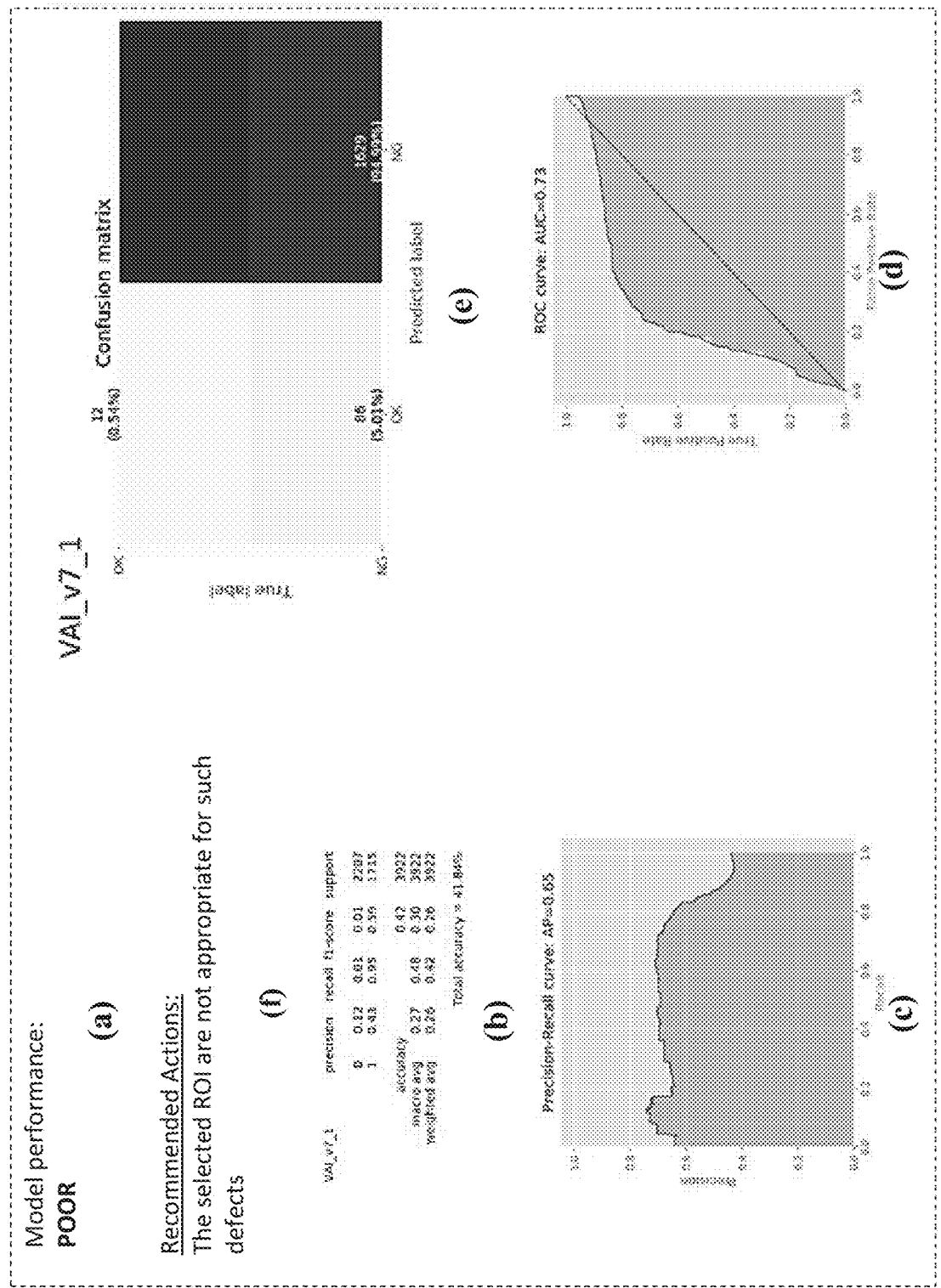
FIG. 12 illustrates an example overall performance report, in accordance with another embodiment of the present disclosure.

FIG. 12 illustrates another example overall performance report, in accordance with another embodiment of the present disclosure.

In an example, FIG. 12(a) refers a Model overall rating "POOR" for a deep learning model having the title as "VAI_V7_1". FIG. 12(h) refers a Precision, recall, f1 score, and so on. FIG. 12(c) refers a "Precision Recall" curve and FIG. 12(d) refers a receiver operating characteristic curve. FIG. 11e refers a Confusion Matrix to depict as to which class is mis-classified. FIG. 12(f) refers a recommendation from Meta Controller 312 that selected ROI are not appropriate. Accordingly, the MetaController 312 refers back to the individual component reports (i.e. the ROI module 308 report) to recommend an action.

In other example, the recommendation may be provided that the present selected ROI and the feature vector did not, operate optimally with previously employed historical models and accordingly the present selected ROI/features corresponds to wrong selection with respect to the present employed input dataset.

Overall, the present subject matter renders an AI toolbox type facility which in turn facilitates collaboration between the operator and the smart toolbox. Each time a model is created as a part of development of code, its performance is stored along with information about the type and features used. The historical data is used at each step to make some recommendation and also used as suggestion tools in case of poor performance.

The historical data is used to propose A/B tests (amongst the ROI, features and deep learning architectures) that are considered automatically as worth investigation investigate. As an example, the A/B testing is conducted in respect of conventional A.I. as well as different D.L architecture. New developed models settings are automatically tested on all product in the historical dataset FIG. 13A and FIG. 13B illustrate a comparative-analysis of the present disclosure with respect to the state of the art.

Figure 13A:
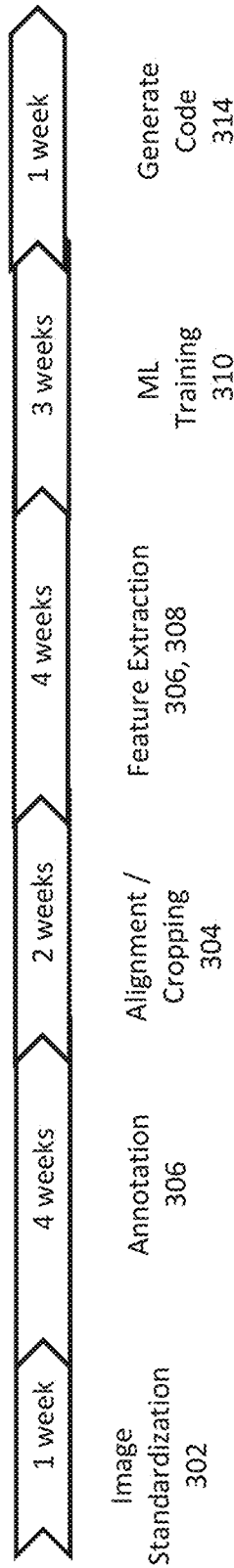
FIG. 13A and FIG. 13B illustrate a comparative analysis of the present disclosure with respect to the state of the art.

FIG. 13A represents total time to develop AI algorithm in conventional way wherein a normally elapsed timeline is 2 months without annotation and 3 months with annotation. On other hand, FIG. 13B depicts a timeline to develop AI algorithm in accordance with the present subject matter as 2 weeks without annotation and 3 weeks with annotation.

Figure 13B:
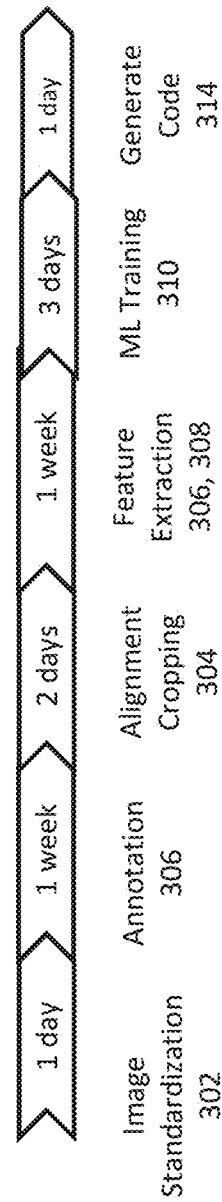

FIG. 13B accordingly refers accelerating the development-time, and enables a quick disengagement of deputed manpower and opens up the bandwidth to accommodate further projects such as AI inspection project by the now free manpower, thereby doing away with constraints associated with manpower resources.

In addition, the GUIs forming a part of each of the module 302 until 413 render a toolbox arrangement which may be hosted online as a web or cloud computing based application to invite participation of external parties in the development work. In another example, the present toolbox may be simply rendered as web based service for online subscription, e.g, through licensing of software (e.g. SaaS).

FIG. 14 illustrates an implementation of the system 300 as illustrated in FIG. 3 in a computing environment. The present figure essentially illustrates the hardware configuration of the system 300 in the form of a computer system 300 is shown. The computer system 1400 can include a set of instructions that can be executed to cause the computer system 1400 to perform any one or more of the methods disclosed. The computer system 1400 may operate as a standalone device or may be connected, e.g., using a network, to other computer systems or peripheral devices.

In a networked deployment, the computer system 400 may operate in the capacity of a server or as a client user computer in a server-client user network environment, or as a peer computer system in a peer-to-peer (or distributed) network environment. The computer system 1400 can also be implemented as or incorporated into various devices, such as a personal computer (PC), a tablet PC, a personal digital assistant (PDA), a mobile device, a palmtop computer, a laptop computer, a desktop computer, a communications device, a wireless telephone, a land-line telephone, a web appliance, a network router, switch or bridge, or any other machine capable of executing a set of instructions (sequential or otherwise) that specify actions to be taken by that machine. Further, while a single computer system 1400 is illustrated, the term "system" shall also be taken to include any collection of systems or sub-systems that individually or jointly execute a set, or multiple sets, of instructions to perform one or more computer functions.

The computer system 1400 may include a processor 1402 (e.g., a central processing unit (CPU), a graphics processing unit (GPU), or both. The processor 1402 may be a component in a variety of systems. For example, the processor 1402 may be part of a standard personal computer or a workstation. The processor 1402 may be one or more general processors, digital signal processors, application specific integrated circuits, field programmable gate arrays, servers, networks, digital circuits, analog circuits, combinations thereof, or other now known or later developed devices for analyzing and processing data The processor 1402 may implement a software program, such as code generated manually (i.e., programmed).

The computer system 1400 may include a memory 1404, such as a memory 1404 that can communicate via a bus 1408. The memory 1404 may be a main memory, a static memory, or a dynamic memory. The memory 1404 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, the memory 1404 includes a cache or random access memory for the processor 1402. In alternative examples, the memory 1404 is separate from the processor 1402, such as a cache memory of a processor, the system memory, or other memory. The memory 1404 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 1404 is operable to store instructions executable by the processor 1402. The functions, acts or tasks illustrated in the figures or described may be performed by the programmed processor 1402 executing the instructions stored in the memory 1404. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the computer system 1400 may or may not further include a display unit 1410, such as a liquid crystal display (LCD), an organic light emitting diode (OLED), a flat panel display, a solid state display, a cathode ray tube (CRT), a projector, a printer or other now known or later developed display device for outputting determined information. The display 1410 may act as an interface for the user to see the functioning of the processor 1402, or specifically as an interface with the software stored in the memory 1404 or in the drive unit 1416.

Additionally, the computer system 1400 may include an input device 1412 configured to allow a user to interact with any of the components of system 1400. The input device 1412 may be a number pad, a keyboard, or a cursor control device, such as a mouse, or a joystick, touch screen display, remote control or any other device operative to interact with the computer system 1400.

The computer system 1400 may also include a disk or optical drive unit 1416. The disk drive unit 1416 may include a computer-readable medium 1422 in which one or more sets of instructions 1424, e.g. software, can be embedded. Further, the instructions 1424 may embody one or more of the methods or logic as described. In a particular example, the instructions 1424 may reside completely, or at least partially, within the memory 1404 or within the processor 1402 during execution by the computer system 1400. The memory 1404 and the processor 1402 also may include computer-readable media as discussed above.

The present invention contemplates a computer-readable medium that includes instructions 1424 or receives and executes instructions 1424 responsive to a propagated signal so that a device connected to a network 1426 can communicate voice, video, audio, images or any other data over the network 1426. Further, the instructions 1424 may be transmitted or received over the network 1426 via a communication port or interface 1420 or using a bus 1408. The communication port or interface 1420 may be a part of the processor 1402 or may be a separate component. The communication port 1420 may be created in software or may be a physical connection in hardware. The communication port 1420 may be configured to connect with a network 1426, external media, the display 1410, or any other components in system 1400 or combinations thereof. The connection with the network 1426 may be a physical connection, such as a wired Ethernet connection or may be established wirelessly as discussed later. Likewise, the additional connections with other components of the system 1400 may be physical connections or may be established wirelessly. The network 1426 may alternatively be directly connected to the bus 1408.

The network 1426 may include wired networks, wireless networks, Ethernet AVB networks, or combinations thereof. The wireless network may be a cellular telephone network, an 802.11, 802.16, 802.20, 802.1Q or WiMax network. Further, the network 1426 may be a public network, such as the Internet, a private network, such as an intranet, or combinations thereof, and may utilize a variety of networking protocols now available or later developed including, but not limited to TCP/IP based networking protocols.

In an alternative example, dedicated hardware implementations, such as application specific integrated circuits, programmable logic arrays and other hardware devices, can be constructed to implement various parts of the system 1400.

At least based on the aforesaid features, the present subject matter renders a centralized mechanism to orchestrate the flow of the overall interaction. The same at least facilitates generating the A/B testing procedure to test different options and automatically run it in batch mode.

Further, the centralized mechanism analyses the performance reports and propose improvements to the user.

In an example, the centralized mechanism may be appropriated for visual inspection mechanism involving a generic method for 2D image alignment for visual inspection tasks. The method can be used for any type and shape of objects. In an example, the method is based on minimally-supervised learning.

The present subject matter renders a time-efficiency since by automatically suggesting options at each step, the operator does not need to explore every method. In most cases, she can just follow the recommended settings based on previous datasets. Further, the present subject matter renders a higher performance by proposing better options than a non-expert user.

Still further, with ever happening progression, new code is developed and consequently new model and data set are added. The present system incrementally updates the historical database with new added options or methods and based thereupon, historical models are automatically retrained and tested with the new options. This at-least facilitates the user with better recommendations and leads to improvement of the deployed models.

Terms used in this disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description of embodiments, claims, or drawings, should be understood to contemplate the possibilities of including one of the terms, either of the terms or both terms. For example, the phrase "A or B" should be understood to include the possibilities of "A" or "B" or "A and B."

All examples and conditional language recited in this disclosure are intended for pedagogical objects aid the reader in understanding the invention and the concepts contributed by the inventor to furthering the art and are to be construed as being without limitation to such specifically recited examples and conditions. Although embodiments of the present disclosure have been described in detail, it should be understood that various changes, substitutions, and alterations could be made thereto without departing from the spirit and scope of the present disclosure.

The invention claimed is:

1. A method for developing machine-learning (ML) based tool for visual inspection, said method comprising the steps of:
   a) initializing a visual inspection process based on one or more selected image defining an input dataset;
   b) fetching historical data similar to the input data set from a historical database;
   c) identifying at least one historically used model associated with the visual inspection based on the fetched historical data set; and
   d) recommending by a controller one or more of a plurality of methods and a control-setting associated with the identified model for the visual inspection process Ro a user, said recommendation defined in respect of one or more of:
      a recommended alignment method and a dataset for training the alignment model;
      a recommended set of features for performing annotation with respect to the aligned images;
      a recommended region of interest (ROI) and a corresponding feature vector; and
      a recommended machine learning model or a deep learning architecture for classification.

2. The method as claimed in claim 1, further comprising:
   determining said identified models as being a plurality of historical models having similar performance records;
   recommending A/B testing in respect of said identified models, wherein said A/B testing is defined by one or more of:
      allowing operation of each of said plurality of models over the input dataset through respectively associated method and control setting; and
      depicting a performance comparison of one model with another model in respect of said input.

3. The method as claimed in claim 1, further comprising:
   receiving an acceptance from a user in respect of said recommendation of the plurality of methods and the control-setting;
   applying said recommendation in respect of a plurality of stages of visual inspection process upon receiving the acceptance; and
   applying user-provided one or more methods and/or one or more control setting upon not receiving the user-acceptance towards said recommendation.

4. The method as claimed in claim 1, wherein said fetching of the historical data similar to the input data set is based on analysis of the input dataset in respect of one or more of:
   an object shape;
   statistical features; and
   statistical differences among classes to the input dataset.

5. The method as claimed in claim 1, further comprising aligning one or more detected objects within an image-frame in relation to said at least one image based on a recommended method or user selected to generate at least one aligned-image from the input dataset; and outputting one or more aligned images based on the input data set based on the alignment method.

6. The method as claimed in claim 5, further comprising;
receiving aligned images outputted from the alignment method performed over input data set;
recommending by the controller based on said aligned images one or more of:
   a set of features to build an annotation system and clusters for annotation;
   a set of features for usage in respect of an annotation system for annotation; and
   dimension-reduction in latent-space with respect to the set of features;
receiving one or more of a user-defined or automatically-defined annotation through a GUI based annotation tool in respect of the aligned images, said GUI based annotation tool defined by:
   a first area for depicting a labelled data set through an annotation system with respect to the aligned images, said annotation system having been built in accordance with the either a) the recommended set of features and dimension reduction or b) user-inputted set of features and dimension reduction; and
   a second area comprising a plurality of controls associated with approving and/or relabeling the labelled set.

7. The method as claimed in claim 6, further comprising:
receiving aligned images outputted from the alignment method performed over input data set and optionally a labelled dataset associated with the aligned images and obtained from an annotation tool;
recommending by the controller based on the received images and the labeled data set one or more of:
   a preferred ROI and a corresponding location;
   a set of features corresponding to the recommended ROI; and
   A/B testing in case of presence of a plurality of sets of historically successful features;
defining a region of interest (ROI) with respect to the aligned image through an ROI model, said ROI being recommended or selected based on a user selection; and
extracting a plurality of features with respect to the ROI in the aligned-images through a feature extractor for providing a feature vector for an ML training module.

8. The method as claimed in claim 7, further comprising
receiving the feature vector with respect to the aligned images by the ML training module to classify the at least one image with respect to one or more labels pre-defined under a visual-inspection;
recommending by the controller based on the received feature vector one or more of:
   in respect of ML models, historically used structures and/or features; and
   in respect of deep learning architecture, one or more corresponding architectures for A/B testing;
receiving a user-selection of either the recommended machine-learning classifier or a user-selected classifier.

9. The method as claimed in claim 8, further comprising
receiving a selection of at-least a machine-learning classifier through an ML training module to operate upon the extracted-features and classify the at least one image with respect to one or more labels pre-defined under a visual-inspection;
considering the selected ML classifier by an ML training controller while fetching a historically used classifier from the historical database;
assessing a performance associated with the selected classifier by the ML training controller with a historical performance associated with the fetched classifier; and
recommending a corrective action by the ML training controller based on said comparison with fetched classifier to achieve in at least one of:
   in respect of ML models, recommending historically successful structures; and
   in respect of deep learning architecture, recommending a plurality of architectures for A/B testing.

10. The method as claimed in claim 8, further comprising:
defining a region of interest (ROI) with respect to the aligned image through a second model, said ROI being automatically selected or manually selected;
extracting a plurality of features with respect to the ROI in the aligned-images through a feature extractor for providing a feature vector for an ML training module;
considering the extracted features pertaining to the ROI by a data feature controller while fetching the set of features and/or historical models similar to the extracted features from the historical database;
assessing a performance by the data feature controller based on the extracted features and comparing said assessment with a historical performance associated with the fetched set of features; and
recommending a corrective action by the data feature controller based on said comparison with fetched features to achieve at least one of:
   a preferred ROI shape and location;
   proposing application of a set of features defined by at least one of average, standard deviation, HOG, LBP;
   proposing A/B testing in case of presence of a plurality of sets of historically successful features.

11. The system as claimed in claim 10, wherein the controller is further configured for:
assessing a current performance of the visual inspection process based on the extracted features and comparing said assessment with a historical performance associated with the fetched set of features;
recommending a first type of corrective action based on said comparison with fetched features as to achieve in respect of the visual inspection process at least one of:
   an improved performance than the current assessed performance; and
   conducting one or more diagnostic tests;
recommending a second type of corrective action by the controller based on a performance and configuration with respect to at least one of alignment model, the feature extractor, a selected machine-learning classifier or deep learning architecture; and
recommending a combination of said first and second corrective action.

12. The system as claimed in claim 10, wherein the controller is configured for fetching of the historical data similar to the input data set is based on analysis of the input dataset in respect of one or more of:
   an object shape;
   statistical features; and
   statistical differences among classes to the input dataset;
wherein the controller is further configured for:
   storing code of a deployed AI model, a machine-learning configuration associated with the AI code, and a dataset corresponding to the AI code;
   associating one or more additional training methods to be pursued for the pre-stored dataset based on the training methods associated with the dataset corresponding to the currently stored AI code; and automatically re-training and testing pre stored AI models based on one or more features associated with the current stored AI model to augment a current performance of the visual inspection system and to augment prospective recommendations from the controller.

13. The method as claimed in claim 8, further comprising:
generating at least one type of AI code to execute a machine-learning driven based inference process for visual inspection,
analyzing the generated AI code for detecting the inference time by a code deployment controller;
extracting historically successful actions associated with correction of the inference time by the code deployment controller, said actions defined by one or more of:
reducing a number of parameters associated with an M.L model,
varying alignment method,
reducing feature space
recommending one or more of said corrective action to update the inference time as determined with respect to the code.

14. The method as claimed in claim 1, further comprising:
assessing a current performance of the visual inspection process by the controller and comparing said assessment with a historical performance; and
recommending a first type of corrective action by the controller based on said comparison to achieve in respect of the visual inspection process at least one of:
an improved performance than the current assessed performance; and
conducting one or more diagnostic tests;
recommending a second type of corrective action by the controller as one or more of:
reducing a number of parameters associated with an M.L model,
varying alignment method,
reducing feature space; and
proposing A/B tests in respect of one or more ML configurations with respect to the visual inspection process;
recommending a combination of said first, and second types of corrective action.

15. The method as claimed in claim 14, further comprising:
generating at-least one type of AI code for deployment on-field to execute a machine-learning driven based inference process for visual inspection,
storing the AI code, a machine-learning configuration associated with the AI code, and a dataset corresponding to the AI code;
associating one or more additional training methods to be pursued for the pre-stored dataset based on the training methods associated with the dataset corresponding to the currently stored AI code; and
automatically re-training and testing pre stored AI models based on one or more features associated with the current stored AI model to augment a current performance of the visual inspection system and to augment prospective recommendations from the controller.

16. The method as claimed in claim 14, further comprising:
receiving one or more of user-defined or automatically-defined annotation through a GUI based annotation tool in respect of the aligned images;
considering the labelled data set or a relabeled data set by an annotation controller and fetching a similar dataset from the historical database;
assessing a performance with respect to said labelled dataset by the annotation-controller and comparing said assessment with a historical performance associated with the fetched similar dataset from database; and
recommending a corrective action by the annotation controller as at least one of:
recommending a set of features; and
dimension-reduction in latent-space with respect to the set of features at least based on principal component analysis.

17. A method for developing machine-learning (ML) based tool for visual inspection, said method comprising:
a) initializing a visual inspection process based on one or more selected image defining a dataset;
b) aligning one or more detected objects within an image-frame in relation to said at least one image based on a first model to generate at least one aligned-image;
c) extracting a plurality of features with-respect to the aligned-images through a feature extractor;
d) fetching one or more of i) a set of features similar to the extracted features and ii) historically used models associated with alignment by a controller from a historical database;
e) assessing a current performance of said alignment executed through the first model by the alignment-controller based on the extracted features and comparing said assessment with a historical performance associated with the fetched set of features and/or historically used models; and
f) recommending a corrective action by the controller based on said comparison to achieve at least one of:
a preferred alignment model and a dataset for training the preferred alignment model;
at least a portion of the image for usage as template;
a set of features for performing annotation with respect to the aligned images;
a region of interest (ROI) and a corresponding feature vector; and
a machine learning model or a deep learning architecture for classification.

18. A system for developing machine-learning (ML) based tool for visual inspection, said method comprising:
an initialization module configured for initializing a visual inspection process based on one or more selected image defining an input dataset;
a controller configured for:
fetching historical data similar to the input data set from a historical database;
identifying at least one historically used model associated with the visual inspection based on the fetched historical data set; and
recommending one or more of a plurality of methods and a control-setting associated with the identified model for the visual inspection process to a user, said recommendation being in respect of one or more of:
a recommended alignment method and a dataset for training the alignment model;
a recommended set of features for performing annotation with respect to the aligned images;
a recommended region of interest (ROI) and a corresponding feature vector; and
a recommended machine learning model or a deep learning architecture for classification.

19. The system as claimed in claim 18, wherein the controller is further configured for:
- determining said identified models as being a plurality of historical models having similar performance records;
- recommending A/B testing in respect of said identified models, wherein said A/B testing is defined by one or more of:
  - allowing operation of each of said plurality of models over the input dataset through respectively associated method and control setting; and
  - depicting a performance comparison of one model with another model in respect of said input.

20. The system as claimed in claim 18, further comprising:
- an alignment model configured for aligning one or more detected objects within an image-frame in relation to said at least one image to generate at least one aligned-image from the input dataset; and
- a feature extractor configured for extracting a plurality of features with-respect to the aligned-images;

wherein the controller is further configured for:
- fetching one or more of i) a set of features similar to the extracted features and ii) historically used models associated with the visual inspection from a historical database; and
- rendering a corrective recommendation based on the fetched similar features and/or the historically used models, said recommendation defined in respect of one or more of:
  - an alignment model and a dataset for training the alignment model;
  - a set of features for performing annotation with respect to the aligned images;
  - a region of interest (ROI) and a corresponding feature vector; and
  - a machine learning model or a deep learning architecture for classification.

* * * * *